G. B. RATTERMANN AND W. W. GARRISON.
AUTOMATIC FIRE ALARM.
APPLICATION FILED NOV. 5, 1917.

1,349,531.

Patented Aug. 10, 1920.
5 SHEETS—SHEET 3.

G. B. RATTERMANN AND W. W. GARRISON.
AUTOMATIC FIRE ALARM.
APPLICATION FILED NOV. 5, 1917.

1,349,531.

Patented Aug. 10, 1920.
5 SHEETS—SHEET 5.

WITNESSES
Howard D. Orr.
F. T. Chapman.

G. B. Rattermann
and W. W. Garrison,
INVENTORS,

BY E. G. Siggers.
ATTORNEY

UNITED STATES PATENT OFFICE.

GEORGE B. RATTERMANN, OF CHICAGO, ILLINOIS, AND WALTER W. GARRISON, OF BIRMINGHAM, ALABAMA.

AUTOMATIC FIRE-ALARM.

1,349,531.  Specification of Letters Patent.  Patented Aug. 10, 1920.

Application filed November 5, 1917. Serial No. 200,421.

*To all whom it may concern:*

Be it known that we, GEORGE B. RATTERMANN and WALTER W. GARRISON, citizens of the United States, residing, respectively, at Chicago, county of Cook, State of Illinois, and Birmingham, county of Jefferson, and State of Alabama, have invented a new and useful Automatic Fire-Alarm, of which the following is a specification.

This invention has reference to automatic fire alarms, being an improvement upon the automatic fire alarm shown, described and claimed in Letters Patent No. 1,195,499, granted to us August 22, 1916.

The object of the invention is to improve and simplify the structure shown in the said Letters Patent and thereby make the structure better adapted for the purposes for which it is designed.

In accordance with the invention, a structure is provided whereby the device may be included in a commercial telephone line without in any manner interfering with the use of the telephone line for the ordinary transmission of messages. The device is arranged to work on the closed circuit system so that in the event of the breaking of the circuit either accidentally, or maliciously, or because of the presence of fire, an alarm will be transmitted to the proper authorities, the apparatus imparting the necessary information in the form of words describing the location of the trouble. Since the device is intended more particularly for indicating the presence of fire, the information may be such as to announce the presence of fire at the place where it may be assumed it has occurred.

The system may be further arranged to produce a local audible alarm in addition to the transmission of a message to the fire department or other appropriate authority.

The invention also comprises other features which will appear hereinafter.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

Figure 1:
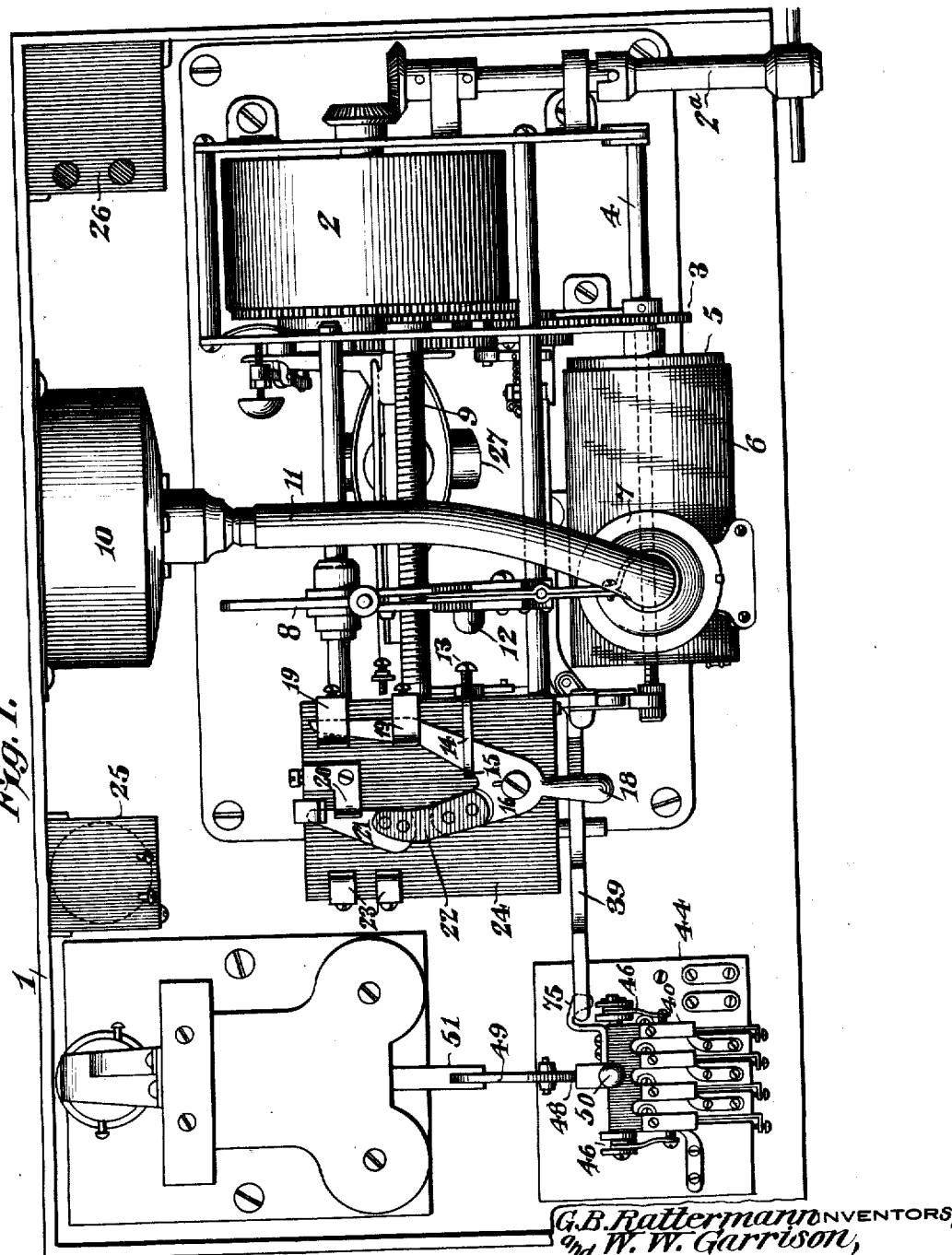
Figure 1 is a plan view of an automatic fire alarm embodying the invention, but omitting the electric circuits and the cover of the casing or housing box.
Figure 2:
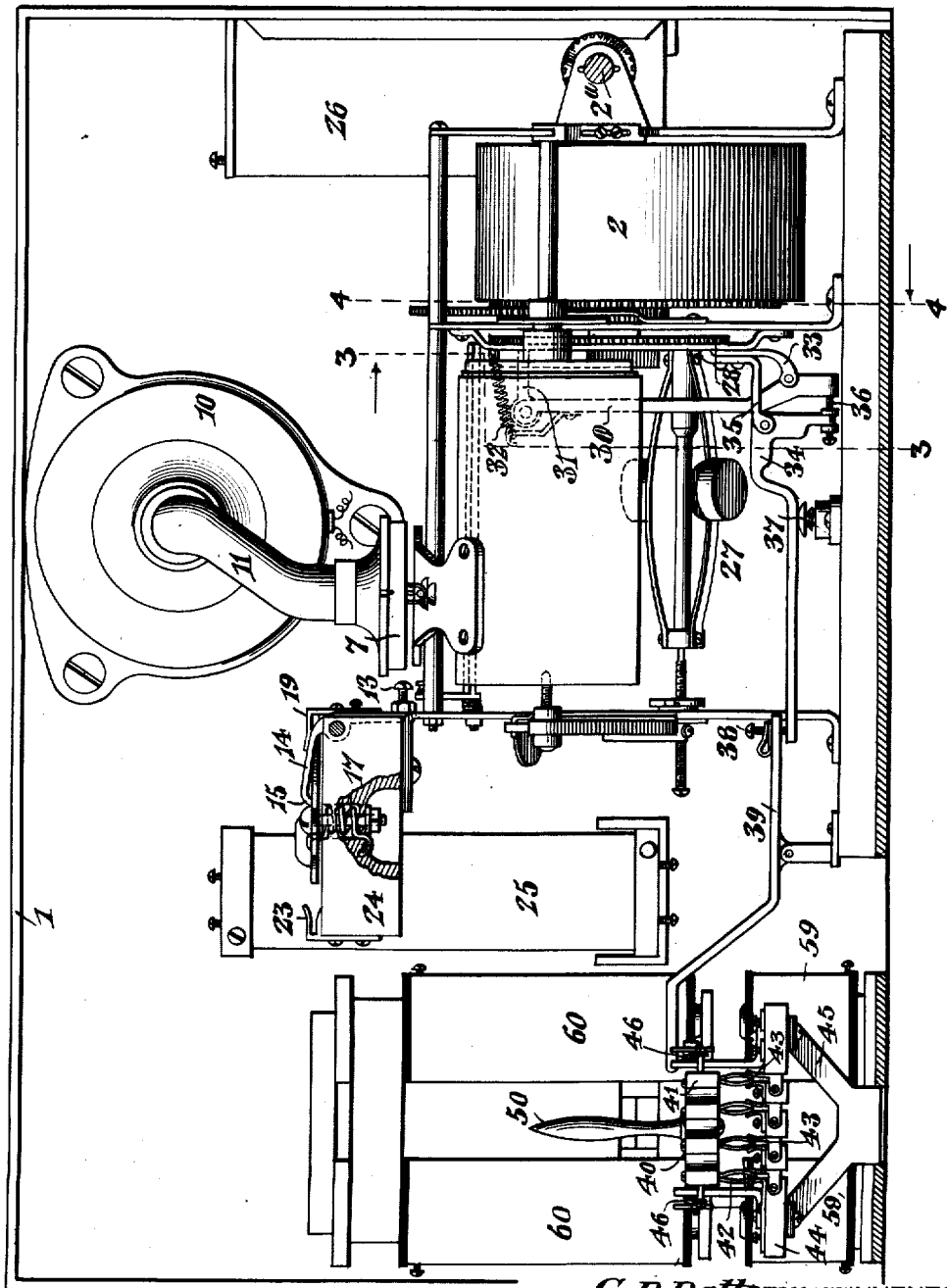
Fig. 2 is a front elevation of the structure shown in Fig. 1, with one side of the casing or housing box omitted to reveal the parts within the casing.
Figure 3:
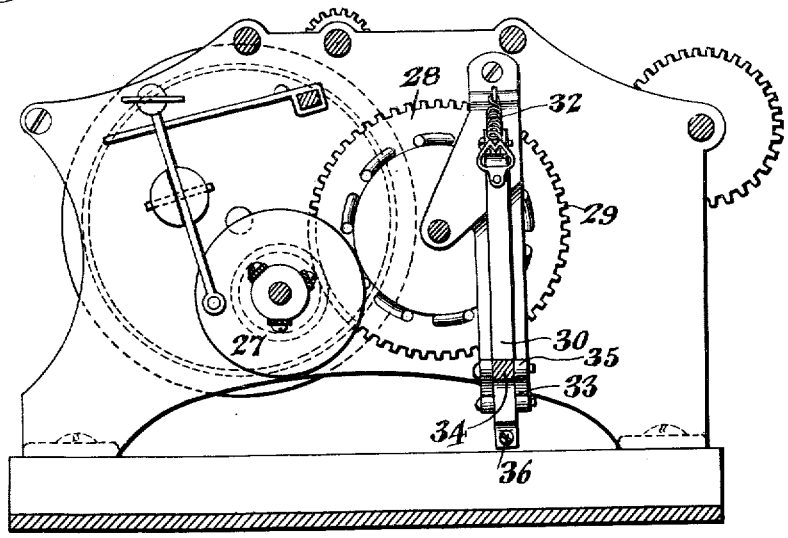
Fig. 3 is a section on the line 3—3 of Fig. 2 but omitting distant parts.
Figure 4:
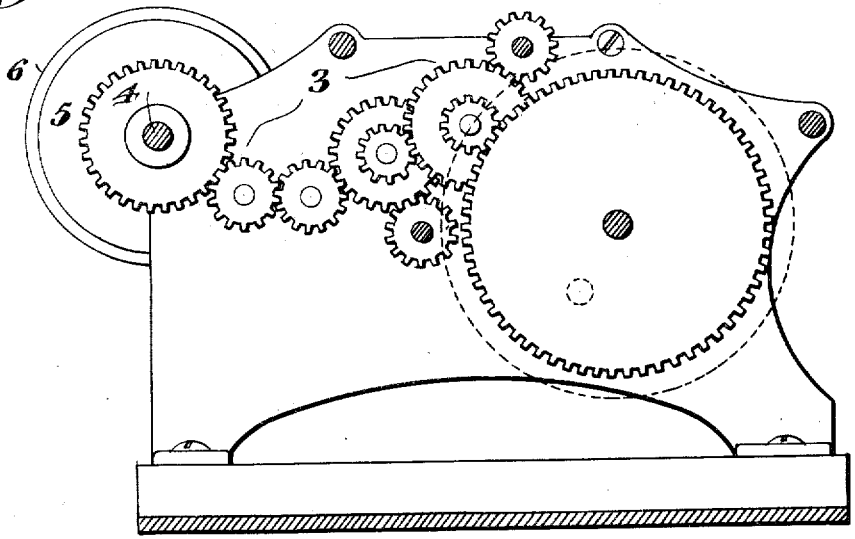
Fig. 4 is a section on the line 4—4 of Fig. 2, but omitting distant parts.
Figure 5:
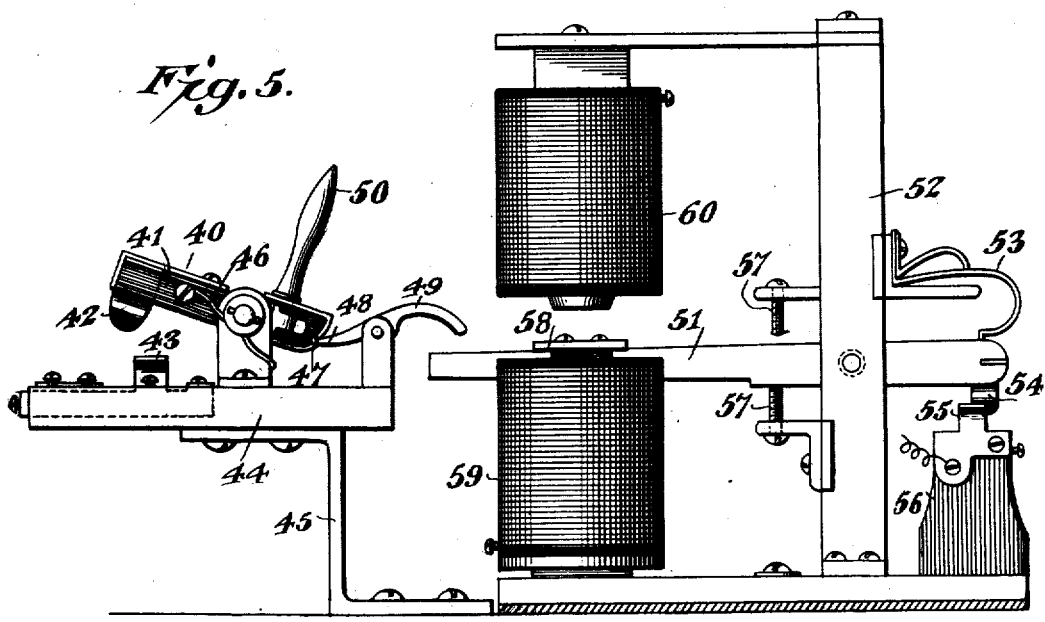
Fig. 5 is a view of the relay and switch mechanism separate from the rest of the apparatus.
Figure 6:
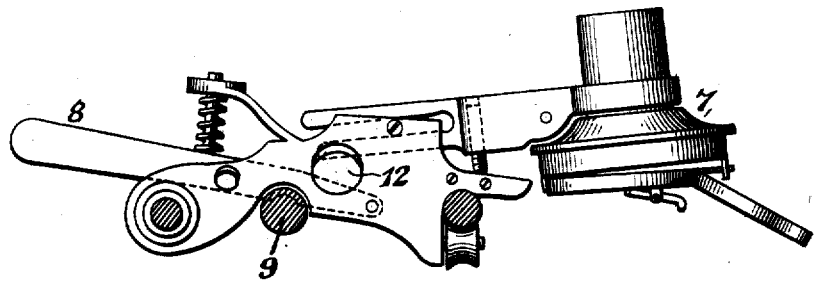
Fig. 6 is a side view of the reproducer carrying arm, showing the supports therefor in cross section.

Referring to the drawings, there is shown a casing or housing 1 in which the various mechanisms are inclosed for protection. Within the housing there is mounted a spring drum 2 which may be provided with a winding key 2$^a$, but these parts require no special description. The spring drum is connected by a train of gearing 3 with an arbor 4 carrying a mandrel 5, such as is customarily employed in phonographs, and upon which is mounted a sound record tablet 6 shown in the drawings as of the usual cylindrical type and which, it may be assumed, is suitably resistant to wear, as is customary.

Arranged in operative relation to the sound record tablet is a sound reproducer 7 with a carrier 8 which may also be considered as of the customary type and requiring no special description. The carrier and reproducer thereon are under the control of the customary feed screw 9 connected to the spring drum 2 for actuation thereby.

Within the casing 1 there is mounted a telephone transmitter 10 which may be of customary form, and this transmitter is connected by a sound conduit or tube 11 with the sound reproducer 7. The conduit 11 is flexible to permit movement of the reproducer 7 along the record tablet 6.

On the carriage 8 is a buffer 12 in the path of which is a regulating screw 13 on one arm of a lever 14 having the other arm provided with a nose 15 in the path of a rock lever 16, the latter being under the control of a spring 17 tending to move the lever 16 in one direction but held by the nose 15 of the lever 14 which serves as a latch lever. The lever 16 is provided with a handle 18 for setting it. In the path of one arm of the lever 16 are contact terminals 19 arranged to be bridged by said arm. Other contact terminals 20 are provided in the path of a bridging piece 21 carried by the other arm of the lever 16 and insulated therefrom by a fiber or other insulating strip 22. There are still other contact terminals 23 in the path of the bridge piece 21. The lever 16 and the contact terminals 19, 20 and 23 are mounted upon an insulating block 24 or may be otherwise supported within the casing 1. The contacts 19, 20 and 23 are included in the telephone circuit and are simply indicated in Fig. 7 by the representation of a lever which may be considered the same as the lever 16 and is so marked in Fig. 7.

Figure 7:
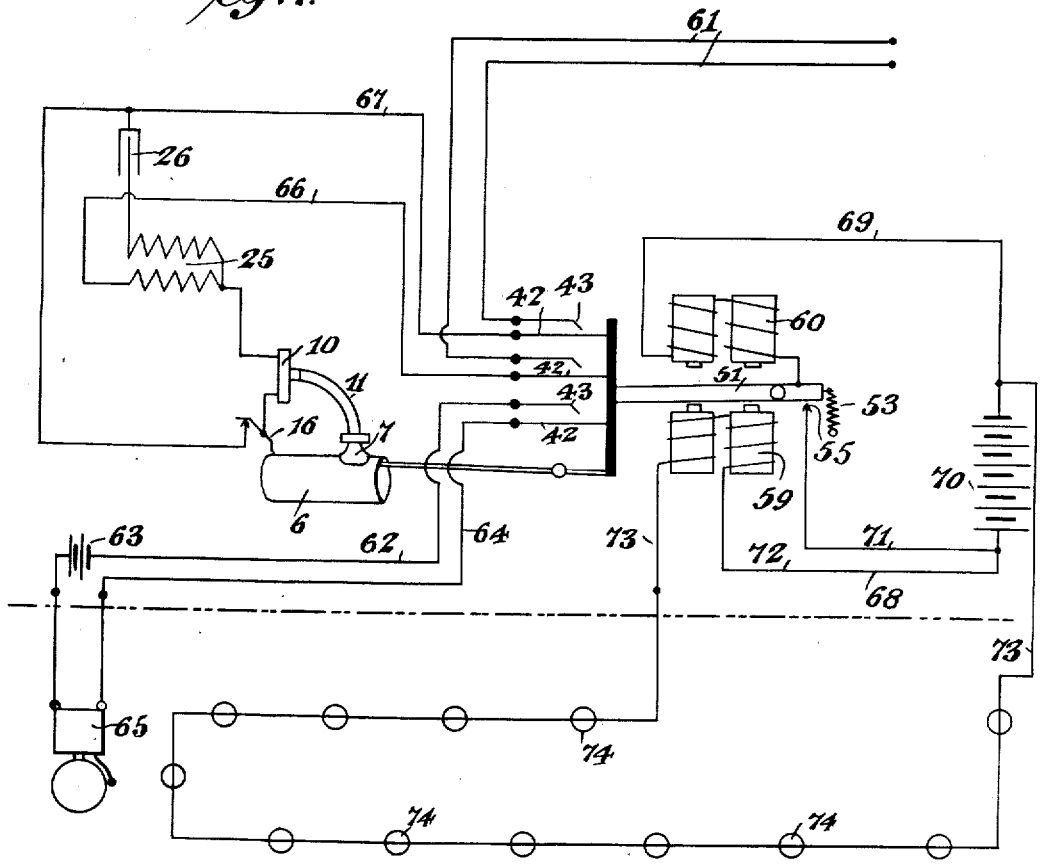
Fig. 7 is a diagram illustrating the electric connections.

The telephone system also includes the usual induction coil 25 and a condenser 26 similarly numbered in the diagram of Fig. 7 but needing no special description, since these are parts of well known construction.

The phonographic mechanism is provided with the usual governor 27 and since it need not differ in any material respect from governors used in phonographic apparatus, needs no special description.

The gear train 3 is furnished with a ratchet wheel 28 which may be furnished with gear teeth 29 for driving the governor and this ratchet wheel 28 has associated with it a lever 30 having a tooth 31 at one end urged toward the ratchet wheel by a spring 32. The arm or lever 30 is mounted on a bracket 33 and is under the control of a lever 34 mounted on another bracket 35 and provided with a regulating screw 36 to engage the lever 30, permitting fine adjustment thereof. One arm of the lever 34 is under the control of a spring push pin 37 tending to maintain that end of the lever 34 remote from the screw 36 in contact with a regulating screw 38 on the corresponding end of another lever 39 to which reference will hereinafter be made. The levers 30, 34 and 39 constitute a release mechanism for starting the motor or driving unit represented by the spring drum 2.

There is also provided a gang switch 40 which may comprise an insulating block 41 with a series of contact blades 42 thereon having contacts 43 in the path of the blades and the whole structure being mounted upon a supporting block 44 carried by a bracket 45 or in any other suitable manner.

The block 41 is under the control of a spring 46 tending to move it so as to bring the blades 42 into engagement with the contacts 43. The block 41 is provided with a notch 47 in which normally engages the nose end 48 of a latch lever 49 mounted on the block 44. The block 41 is provided with a handle 50 for its manipulation. The arrangement is such that when the nose 48 is lodged in the notch 47, the blades 42 are out of engagement with the contacts 43, but when the latch lever 49 is actuated to release the block 41, the spring 46 will bring the blades 42 into engagement with the contacts 43, thus closing circuits in which these parts may be included as will be hereinafter seen.

The latch 49 is in the path of one end of an armature lever 51 pivotally mounted on a post 52 and having the end remote from that intended to engage the lever 49 under the control of a spring 53. The last-named end of the lever 51 carries a contact blade 54 in the path of which there is located a contact 55 on the support 56. Set screws 57 are provided on the post 52 to limit movements of the lever 51. On opposite sides of an armature 58 carried by the lever 51 are electromagnets 59 and 60 respectively, so disposed that the magnet 59 will move the lever 51 away from the latch lever 49, while the magnet 60 will move the lever 51 toward the latch lever 49.

The electric circuits are illustrated in Fig. 7 which also shows diagrammatic representations of certain of the mechanisms included in the electric circuits.

In Fig. 7, telephone line conductors are indicated at 61. Two of these conductors are connected to two of the contacts 43. A third one of the contacts 43 is connected by a conductor 62 to a battery 63 or other suitable source of current, while a companion one of the contacts 42 is connected by a conductor 64 to one side of a bell 65 or other suitable means for giving an audible alarm, the bell in turn being connected to the other side of the battery 63.

One side of the induction coil 25 is connected to the telephone transmitter 10, while one branch of the other side of the induction coil 25 is connected by a conductor 66 to another one of the contacts 42. The other contact 42, there being three such contacts, is connected by a conductor 67 to one of the contacts under the control of the switch 16. The conductor 67 is also connected to one side of the condenser 26 which is in turn connected to the other branch of the induction coil 25. In Fig. 7, no attempt is made to indicate the connections of the switch 16, whereby the normal telephone service is restored when the switch 16 is actuated by the movement of the sound reproducer, this being the same as in the aforesaid Letters Patent, so that interruption of the ordinary telephone communication is only for the period of operation of the device of this invention, which period of operation need only be long enough to transmit a message a suitable number of times. For instance, a spoken alarm represented by the sound record may be repeated, say, three times, and may give the location and assumed cause of the alarm. Such message is transmitted to a central telephone station and may be relayed from there to their headquarters or other chosen location.

The magnets 59 and 60 are connected by conductors 68 and 69 to opposite sides of a battery 70 or other suitable source of current. One side of the magnet 60 is connected to the armature 51 or contact 54, while the contact 55 is connected by a conductor 71 to that side of the battery 70 remote from the side connected to the conductor 69. One terminal of the magnet 59 is connected by a conductor 72 to the same side of the battery 70 to which the conductor 71 is connected.

The same side of the battery 70 to which the conductor 69 is connected in turn connected by a conductor 73 to a series of normally closed circuit breakers 74, these being preferably thermal circuit breakers responsive to a predetermined degree of heat. The conductor 73 is connected to that side of the magnet 59 remove from the conductor 72.

The battery 70 is of the closed circuit type and under normal conditions the magnet 59 is energized, attracting the armature 58 and holding the armature lever 51 so that the contacts 54 and 55 are separated and the spring 53 is under tension. Under these circumstances, the lever 51 is out of engagement with the latch 49 and the gang switch 40 is open, wherefore the various electric circuits in the device are also open.

When the gang switch block 41 is in the raised position, a finger 75 thereon is in underriding relation with that end of the lever 39 remote from the screw 38. When the block 41 is released, the finger 75 is raised causing the lowering of the screw 38 and a corresponding lowering of the end of the lever 34 engaged by the screw 38, the spring device 37 being likewise lowered. This action causes a rocking of the lever 34 in opposition to the spring 32 to an extent carrying the tooth 31 out of the path of the gear wheel engaged thereby, so that the spring in the spring drum 2 is released to action.

If it be assumed that the parts are all properly adjusted and inactive and that a fire occurs within a building protected by the apparatus, someone of the thermal responsive devices 74 will be caused to operate, thus breaking the circuit energizing the magnet 59. The lever 51 is thereupon released to the action of the spring 53 so that the gang switch is moved into the closed position and if the parts be suitably adjusted there is established a new circuit from the battery 70 to the magnet 60 by way of the contacts 54 and 55. This causes the attraction by the magnet 60 of the armature 58 on the lever 51 with a pull strong enough to surely release the gang switch which thereupon closes. As soon as the block 41 is released and moves under the action of the spring 46 to close the gang switch, the levers 39, 34 and 30 are actuated to release the spring drum which thereupon causes the rotation of the sound record tablet and the reproduction of sound recorded thereon into the telephone transmitter. At the same time the telephone transmitter circuit is closed through appropriate contacts 42 and 43 and sound is sent to the central station. Prior to this time, the telephone circuit represented by the conductors 61 connected to the mains from the central station side of any telephone apparatus in the building have been on open circuit, but now the telephone transmitter 10 is connected up operatively, the transmission of the alarm continues until the reproducing apparatus is brought into engagement with the screw 13, whereupon the switch 16 is released, cutting out the telephone transmitter so that the telephone line is again ready for the transmission of ordinary messages after the brief interruption due to the action of the devices of the invention. In the meantime, the bell or other audible alarm 65 has been put into operation by the closing of the circuit at appropriate ones of the contacts 42 and 43 and may continue to operate until purposely stopped. The bell 65 may represent one or more alarms within or without the building or both within and without the building in which the device is installed.

The apparatus will work to send an alarm whether the circuit be broken by the effects of fire or whether the wires be cut by someone maliciously inclined. After having once been actuated, the device, which may be under lock and key if desired, cannot be reset except by an authorized person.

The battery 70 may be of moderate voltage, say 6 to 8 volts. The magnet 59 may be of rather high resistance, say 104 ohms, more or less. The magnet 60 may have about 20 ohms resistance. The magnet 59 therefore has a weaker pull than the magnet 60, while the latter has a sufficiently powerful pull to overcome all mechanical resistance offered by the lever 51 and parts connected thereto and to surely release the gang switch to movement to the closed position.

The casing 1 with the parts closed may be installed at any convenient point but preferably one not at all accessible to unauthorized persons, thus correspondingly protecting the apparatus from tampering or from accidental injury.

The device is of a nature permitting it to be connected up with ordinary telephone service without in any manner interfering with such service and hence independent of all apparatus owned by the telephone company and installed upon the premises.

While the phonographic apparatus has been shown and described as of the cylindrical type, it will be understood that any other known types of apparatus for the purpose may be employed.

What is claimed is:

1. In an automatic fire alarm, a telephone unit for inclusion in an installed telephone circuit, phonographic means in constant acoustical connection with the telephone unit, driving means for the phonographic means, normally closed-circuit electrical means including a switch for controlling the phonographic means and the telephone unit to start the former and couple the latter into the telephone circuit on the rupture of the closed circuit, and other electro-magnetic means in operative relation to the switch, one electro-magnetic means holding the switch in one position when the closed circuit is intact and the other electro-magnetic means holding the switch in another position when the closed circuit is broken.

2. In an automatic fire alarm, a telephone transmitter unit for inclusion in an installed telephone circuit, phonographic means in constant acoustical connection with the telephonic unit, driving means for the phonographic means, closed-circuit electric means including a relay and an armature switch controlled thereby, another relay in position to attract the armature and controlled by the switch under the control of the armature, a gang switch normally held in the open position and provided with means under the control of the second relay for releasing the gang switch to couple the telephonic apparatus into the main circuit, and means for cutting out the telephone transmitter from the main circuit when the phonographic means has traveled a predetermined distance.

3. An automatic fire alarm, comprising a complete telephone transmitter apparatus for inclusion in an established telephone system, phonographic means constantly coupled to the telephonic transmitter and having a constant tendency to move operatively, opposed relays with means for energizing them, with the circuit of one relay provided with circuit-breaking devices responsive to abnormal conditions and normally on closed circuit, and the other relay normally on open circuit, means under the control of the normally closed circuit for causing the closure of the normally open circuit when the continuity of the normally closed circuit is broken, means for releasing the phonographic apparatus, and a gang switch under the control of the relays for closing the circuit between the telephonic unit and the main telephone circuit.

4. An automatic fire alarm, comprising a complete telephone transmitter apparatus for inclusion in an established telephone system, phonographic means in constant acoustical connection with the telephonic transmitter and having a constant tendency to move operatively, opposed relays with means for energizing them, with the circuit of one relay provided with circuit-breaking devices responsive to abnormal conditions and normally on closed circuit and the other relay normally on open circuit, means under the control of the normally closed circuit for causing the closure of the normally open circuit when the continuity of the normally closed circuit is broken, means for releasing the phonographic apparatus, an alarm including an audible electrically operated alarm apparatus, a gang switch having electrical terminals for closing the circuit between the telephonic unit and the main telephone circuit and other electric terminals for closing the circuit of the alarm apparatus, and means under the control of the relays for holding the gang switch normally open and releasing it to close under abornal conditions.

5. An automatic fire alarm apparatus, comprising a telephonic transmitter unit for inclusion in an established telephone system, a phonographic apparatus constantly connected with the telephonic apparatus and having a constant tendency to move actively, means in the path of the phonographic apparatus for cutting out the telephonic unit at the completion of travel of the phonographic apparatus, devices responsive to abnormal conditions, opposed electromagnets, a source of electric current, electric connections between the devices responsive to abnormal conditions, the electromagnets and the source of current, with one of the electromagents normally in closed circuit with the source of current and the other electromagnet on open circuit, means under the control of the normally closed circuit for causing the closure of the normally open circuit when the continuity of the normally closed circuit is broken, a gang switch for controlling the circuit connections of the telephonic unit with the established telephonic system, and means under the control of the electromagnets for normally holding the gang switch on open circuit and for closing the gang switch on the breaking of the normally closed electric circuit.

6. An automatic fire alarm apparatus, comprising a casing, a phonograph mounted therein and provided with actuating means having a constant tendency to operate, a switch device within the casing having a normal tendency to move in one direction, means under the control of the phonographic apparatus for releasing the switch at the completion of travel of the phonographic apparatus, a telephone transmitter within the casing in constant communication with the phonographic apparatus, an induction coil and a condenser within the casing associated with the telephone transmitter for inclusion of the latter in a telephone system, and a gang switch and operating magnets therefor also included in the casing, the magnets being in opposed relation and provided with an armature for causing actuation of the gang switch, and release mechanism for the phonographic apparatus under the control of the gang switch.

7. In an automatic fire alarm apparatus, means for transmitting an alarm, and means for controlling the transmission of the alarm, comprising opposed magnets, an armature responsive to each magnet, switch means in the path of the armature and having a normal tendency to close, for causing the inclusion of the alarm means in the circuit over which it is to be transmitted, a closed-electric circuit including one of the magnets, a source of energy and means responsive to abnormal conditions for breaking the closed circuit, and means for causing the coupling of the second magnet to the source of energy on the breaking of the normally closed circuit and thereby attract the armature to release the switch means in the path thereof.

8. In an automatic fire alarm apparatus provided with associated phonographic and telephonic means for transmitting an alarm, a normally closed electric circuit including a source of electric energy and responsive to abnormal conditions to break the circuit and also provided with controlling means for the phonographic and telephonic means, said controlling means consisting of a normally open gang switch having a constant tendency to close, opposed magnets, with one of the magnets normally included in the closed circuit and the other magnet excluded therefrom, and an armature for the magnets provided with means for causing the energization of the second-named magnet by the said source of electric energy, said armature being in position to release the gang switch, and said gang switch having means for releasing the phonographic means and coupling up the telephonic means in an established telephonic circuit.

In testimony that we claim the foregoing as our own, we have hereto affixed our signatures in the presence of two witnesses.

GEORGE B. RATTERMANN.
WALTER W. GARRISON.

Witnesses for Geo. B. Rattermann:
 E. GERHART,
 S. MUELLER.
Witnesses for Walter W. Garrison:
 S. B. WILSON,
 R. G. JOHNSON.